United States Patent
Thompson

(10) Patent No.: US 10,480,710 B2
(45) Date of Patent: Nov. 19, 2019

(54) MOUNTING ASSEMBLY

(71) Applicant: 3M INNOVATIVE PROPERTIES COMPANY, St. Paul, MN (US)

(72) Inventor: Craig D. Thompson, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/735,031

(22) PCT Filed: Jun. 7, 2016

(86) PCT No.: PCT/US2016/036126
§ 371 (c)(1),
(2) Date: Dec. 8, 2017

(87) PCT Pub. No.: WO2016/200755
PCT Pub. Date: Dec. 15, 2016

(65) Prior Publication Data
US 2018/0156382 A1 Jun. 7, 2018

Related U.S. Application Data

(60) Provisional application No. 62/173,646, filed on Jun. 10, 2015.

(51) Int. Cl.
*F16B 47/00* (2006.01)
*A47G 1/17* (2006.01)
(Continued)

(52) U.S. Cl.
CPC ............. *F16M 13/022* (2013.01); *A47G 1/16* (2013.01); *A47G 1/17* (2013.01); *A47G 1/175* (2013.01);
(Continued)

(58) Field of Classification Search
CPC . A47G 1/16; A47G 1/17; A47G 1/175; A47G 29/08; A47G 29/087; A47K 1/09;
(Continued)

(56) References Cited

U.S. PATENT DOCUMENTS 4,024,312 A   5/1977   Korpman
5,507,464 A   4/1996   Hamerski
(Continued)

FOREIGN PATENT DOCUMENTS

DE   3331016       11/1984
EP   2737831       6/2014
WO   WO 1995-06691  3/1995

OTHER PUBLICATIONS

International Search Report for PCT International Application No. PCT/US2016/036126, dated Aug. 30, 2016, 3 pages.

*Primary Examiner* — Tan Le
(74) *Attorney, Agent, or Firm* — Kevin Weber

(57) ABSTRACT

The present disclosure relates generally to an improved mounting assembly. In general, the mounting device includes a cover plate, a frame (at least a portion of which is adjacent to the cover plate), and an accessory that is attachable to the cover plate. The frame includes generally horizontal top and bottom portions or members that cooperatively limit or prohibit lateral motion of the cover plate relative to the frame when the cover plate is attached to the frame and is attached to a wall or vertical surface. The presence of the generally horizontal bottom and top portions or members facilitate faster and easier application and removal of the mounting assembly to a wall or other vertical surface by permitting the mounting assembly to be removed from the backplate on the wall in a single step.

16 Claims, 7 Drawing Sheets

(51) Int. Cl.
*F16M 13/00* (2006.01)
*F16B 45/00* (2006.01)
*A47G 1/16* (2006.01)
*A47G 29/08* (2006.01)
*A47K 10/12* (2006.01)
*A47F 5/08* (2006.01)
*F16M 13/02* (2006.01)
*A47K 1/09* (2006.01)
*A47K 5/02* (2006.01)
*F16B 21/07* (2006.01)
*A47G 29/087* (2006.01)
*A47K 5/04* (2006.01)
*B25H 3/00* (2006.01)

(52) U.S. Cl.
CPC ........... *A47G 29/08* (2013.01); *A47G 29/087* (2013.01); *A47K 1/09* (2013.01); *A47K 5/02* (2013.01); *A47K 5/04* (2013.01); *B25H 3/00* (2013.01); *F16B 21/071* (2013.01); *F16B 21/073* (2013.01); *F16B 47/003* (2013.01); *A47K 2201/02* (2013.01); *F16B 45/00* (2013.01)

(58) Field of Classification Search
CPC .... A47K 5/02; A47K 5/04; B25H 3/00; F16B 21/071; F16B 21/073; F16B 47/003; F16B 45/00; F16M 13/022

USPC ......... 248/205.3, 304, 306, 307, 309.1, 489, 248/683, 690
See application file for complete search history.

(56) References Cited

U.S. PATENT DOCUMENTS

| | | |
|---|---|---|
| 5,516,581 A | 5/1996 | Kreckel |
| 6,131,773 A | 10/2000 | Wade |
| 7,594,636 B2* | 9/2009 | Wong ................. A47G 1/20 248/205.3 |
| 7,665,707 B2 | 2/2010 | Morrison |
| 7,802,766 B2 | 9/2010 | Thompson |
| 8,020,820 B2 | 9/2011 | Thompson |
| D669,335 S | 10/2012 | Tien |
| 8,757,570 B2* | 6/2014 | Ernst .................. F16B 45/00 248/223.41 |
| 8,814,112 B2 | 8/2014 | Thompson |
| 8,979,054 B2 | 3/2015 | Thompson |
| 9,920,783 B2* | 3/2018 | Runge ................. H05K 999/99 |
| 2007/0102601 A1* | 5/2007 | Thompson ............ A47G 1/175 248/205.1 |
| 2007/0257165 A1 | 11/2007 | Newbould |
| 2008/0053932 A1* | 3/2008 | Newbould ............ A47B 55/02 211/88.01 |
| 2009/0242712 A1 | 10/2009 | Thompson |
| 2012/0153102 A1* | 6/2012 | Thompson ............ A47G 1/175 248/205.3 |

\* cited by examiner

MOUNTING ASSEMBLY

CROSS REFERENCE TO RELATED APPLICATIONS

This application is a national stage filing under 35 U.S.C. 371 of PCT/US2016/036126, filed Jun. 7, 2016, which claims the benefit of provisional Application No. 62/173,646, filed Jun. 10, 2015, the disclosure of which is incorporated by reference in its/their entirety herein.

TECHNICAL FIELD

The present disclosure relates generally to an improved mounting assembly.

BACKGROUND

Double-faced adhesive tapes (i.e., tapes bearing adhesive on both major opposing surfaces) are widely known and used to attach articles to surfaces. For example, stretch-releasing adhesive tapes have found use in a wide variety of assembling, joining, attaching, and mounting applications. One example of a commercially available double-sided, stretch-releasing adhesive product is COMMAND® strips sold by 3M Company. These double-sided, stretch-releasing adhesive products can be attached to an article support device that has a hook, clip, hanger, etc. Utensils, decorations, tools and various other articles (generally referred to as accessories) can then be hooked, clipped, hung, or otherwise attached to the support device. Examples of such assemblies are described in, for example, U.S. Pat. Nos. 7,802,766; 8,020,820, and 8,814,112.

Article support devices using a stretch-releasable adhesive tape often comprises a base comprising a planar surface configured to be attached to the stretch-releasable adhesive tape, in combination with a support body that comprises an article support member and that is removably attachable to the base, so that, when it is desired to remove the device from a mounting surface, the body can be detached from the base so as to access and activate the stretch-releasable adhesive.

One specific example of an attachment or mounting assembly 1 is shown in FIG. 1 in which a bath caddy 10 is attached to two vertical walls 80, 180 by an attachment system including a coupling plate 20, 120; a mounting plate 40, 140; and an adhesive strip 60, 160. Adhesive strips 60, 160 adhere mounting plate 40, 140 to wall 80, 180. Mounting plate 40, 140 and coupling plate 20, 120 securely mate or attach to one another, and coupling plate 20, 120 mates, attaches, or is formed on bath caddy 10. The entire attachment assembly 1 permits bath caddy 10 to be hung or mounted on a wall or in a corner between two walls 80, 180.

SUMMARY

Some embodiments of the present disclosure relate to a mounting assembly, comprising: a cover plate having a front surface and a rear surface; the front surface of the cover plate including an attachment device capable of attaching an accessory to the cover plate; the rear surface of the cover plate capable of being slid into (or otherwise attached to) a backplate; a frame having both a bottom member and a top member that are each closely adjacent to at least a portion of the cover plate such that the bottom and top members limit or prohibit lateral motion of the cover plate relative to the frame when the cover plate is in the frame and attached or adhered to a vertical surface; and adhesive strips capable of adhering the backplate to a vertical surface.

In some embodiments, the accessory is at least one of a utensil, a decoration, a tool, and/or another device or article. In some embodiments, the frame includes opposed side members. In some embodiments, the frame includes opposed top and bottom members. In some embodiments, the frame includes opposed side members and opposed top and bottom members and the opposed top and bottom members each connect with and are generally perpendicular to each of the opposed side members. In some embodiments, the attachment device is a hook. In some embodiments, the accessory snaps into the attachment device. In some embodiments, the adhesive strips are double-sided adhesive strips. In some embodiments, the adhesive strips are stretch-release adhesive strips. In some embodiments, the adhesive strips include a tab.

DETAILED DESCRIPTION

The inventors of the present disclosure invented a mounting assembly that is capable of mounting an accessory such as, for example, a utensil, a decoration, a tool, and/or another device or article. In general, the mounting device includes a cover plate, a frame (at least a portion of which is adjacent to the cover plate), and an accessory that is attachable to the cover plate. The frame includes a generally horizontal bottom portion or member and an opposed, generally parallel generally horizontal top portion or member that cooperatively limit or prohibit lateral motion of the cover plate relative to the frame when the cover plate is attached to the frame and is attached to a wall or vertical surface. More specifically, the bottom and top portions or members of the frame (when attached to cover plate and when the mounting assembly is attached or adhered to wall) limit or prohibit lateral motion of the cover plate relative to the frame. The presence of the bottom and top portions or members facilitate faster and easier application and removal of the mounting assembly to a wall or other vertical surface by permitting the mounting assembly to be removed from the backplate on the wall in a single step (instead of requiring the user to first remove the accessory and then remove the cover plate from the backplate).

Figure 1:
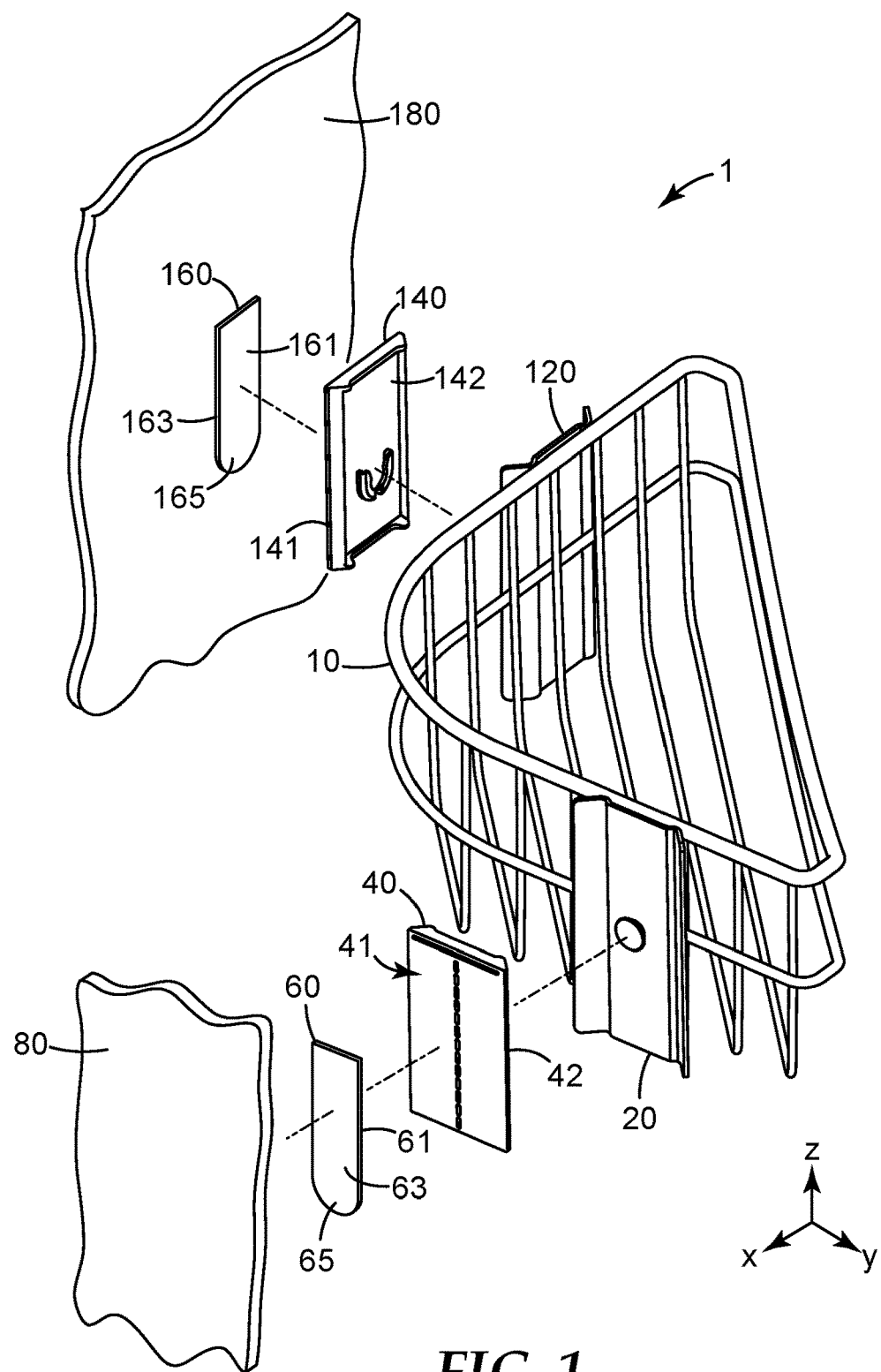
FIG. 1 is an exploded schematic view of a prior art mounting assembly.
Figure 2:
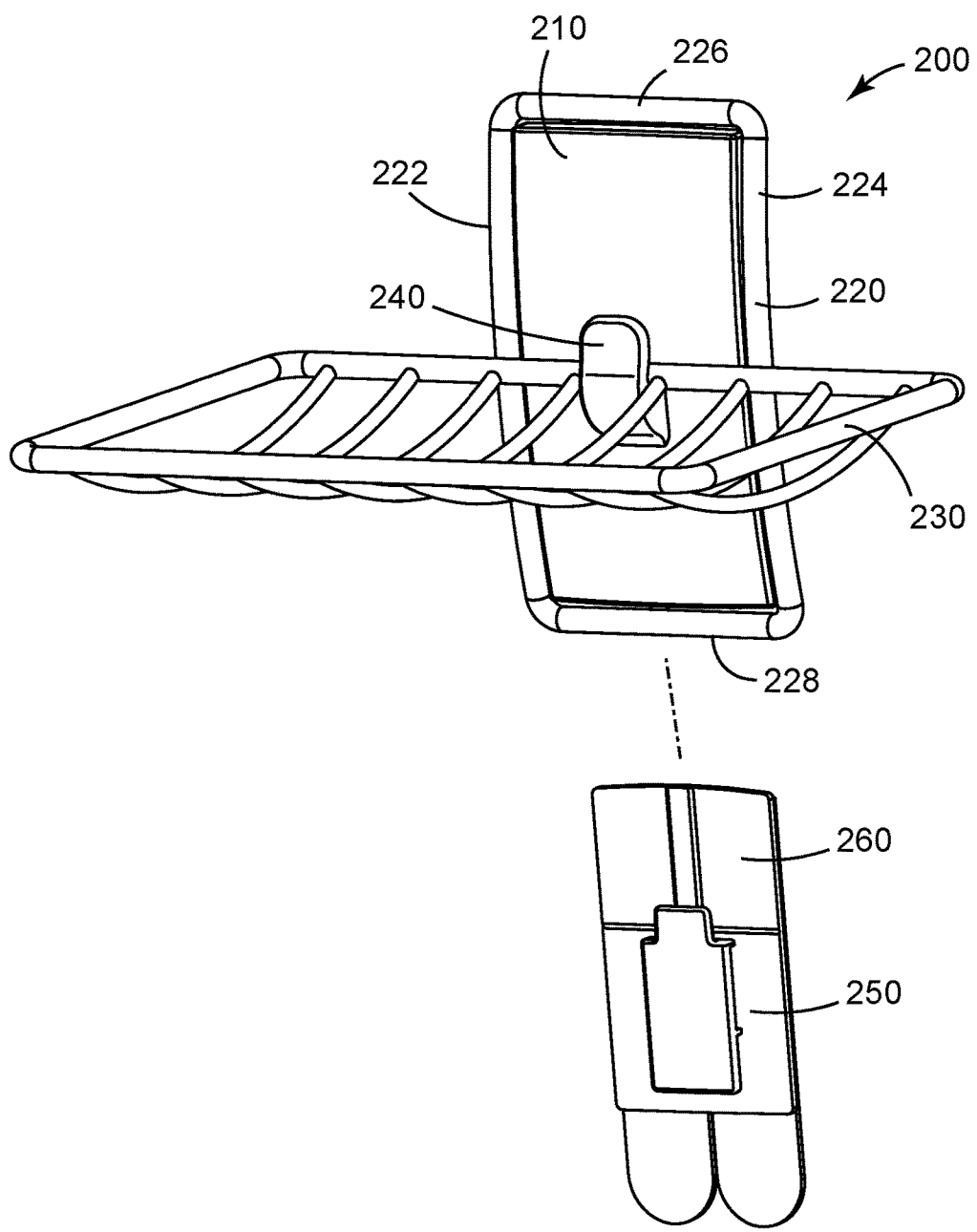
FIG. 2 is a schematic view of a mounting assembly according to the present disclosure.

One exemplary embodiment of a mounting device in accordance with the present disclosure is shown in FIG. 2. The mounting assembly 200 includes a cover plate 210; a frame 220; and an accessory 230 that is attachable to cover plate 210. In the specific embodiment shown in FIG. 2, accessory 230 is shown as a soap holder or soap dish. Those of skill in the art will appreciate that any accessory (including, for example, utensils, decorations, tools, and various other articles) can be used with the teachings described herein. Some exemplary alternative accessories are shown, for example, in FIGS. 4-6.

In the specific embodiment shown in FIG. 2, frame 220 includes opposed side members 222, 224, and opposed top and bottom members 226, 228. Top and bottom members 226, 228 each connect with and are generally perpendicular to each of side members 222, 224. Those of skill in the art will appreciate that alternative frame designs and constructions may be used. For example, all portions of frame 220 are optional except for bottom portion 228 and top portion 226. Bottom portion 228 (when attached to cover plate and when the mounting assembly is attached or adhered to wall) limits or prohibits lateral motion of cover plate 210 relative to frame 220. As such, the shape and design of the frame can be varied as long as bottom portion 228 is present to limit or prohibit motion of the cover plate relative to frame 220 when the cover plate is attached to the frame and the mounting assembly is attached or adhered to a wall.

In the specific embodiment shown in FIG. 2, accessory 230 is attached to cover plate 210 by a hook 240 that permits snap fit connection between cover plate 210 and a portion of accessory 230. Those of skill in the art will appreciate that attachment mechanisms other than hook 240 can be used to mate or attach cover plate 210 to accessory 230. Alternative attachment mechanisms or means can include, for example, mechanical or adhesive attachment mechanisms or means.

In the specific embodiment shown in FIG. 2, cover plate 210 slidably attaches or mates with a backplate 250 portion that is adjacent to adhesive strips 260. This backplate design and function is shown in greater detail in U.S. Pat. Nos. 5,507,464 and 8,979,054, the entirety of each of which is incorporated by reference herein. Those of skill in the art will appreciate that attachment mechanisms other than backplate 250 can be used to mate or attach cover plate 210 to adhesive strips 260. Alternative attachment mechanisms or means can include, for example, mechanical or adhesive attachment mechanisms or means.

Adhesive strips 260 can be any desired adhesive strip including, for example, stretch release adhesive strips, double-sided adhesive strips, etc. Double-sided (also referred to as double-faced adhesive strips) can comprise any suitable sheet, film, layer, etc. that comprises pressure-sensitive adhesive functionality on oppositely-facing major surfaces. The double-faced adhesive can comprise any suitable adhesive that is available in the form of a sheet, tape, roll good, etc., from which a discrete piece of adhesive can be obtained that is suitable for being contacted with and bonded to bonding surface. Suitable adhesives thus include double-stick tapes, laminating adhesives, double-faced foam tapes, and the like, as are commonly known in the art.

In some embodiments, the adhesive strips include a stretch-release adhesive. Such a stretch-release property can allow the adhesive to be securely attached to a surface and to be later removed from the surface without visual disfigurement of, or leaving adhesive residue on, the surface. An exemplary suitable stretch-releasing adhesive can include an elastic backing, or a highly extensible and substantially inelastic backing, with a pressure-sensitive adhesive disposed (e.g. coated) thereupon. Or the stretch-releasing adhesive can be formed of a solid, elastic pressure sensitive adhesive. Thus, in this context, the term stretch-releasing adhesive encompasses products that comprise a unitary, integral, or solid construction of adhesive (in addition to products that comprise a backing with separate layers of adhesive residing thereupon). Suitable exemplary stretch-releasing adhesives are described in U.S. Pat. No. 4,024,312 to Korpman; German Patent No. 33 31 016; U.S. Pat. No. 5,516,581 to Kreckel et al.; and PCT International Publication No. WO 95/06691 to Bries et al, all of which are incorporated herein in their entirety. Such stretch-release adhesives can range, for example, from about 0.2 mm in thickness to about 2 mm in thickness.

In embodiments where the mounting system is to be mounted in a moist environment (e.g., if the accessory is to be mounted in a shower, tub, or bathroom), the composition of the stretch-releasing adhesive can be chosen so as to maintain appropriate adhesion in the presence of moisture.

In some embodiments, the stretch-release adhesive includes a pull tab portion (e.g., an end of the tab that does not comprise adhesive), which may be grasped by a user and pulled so as to activate the stretch-release properties of the adhesive when it is desired to detach the mounting assembly (or a portion thereof) from the wall.

A single piece or multiple pieces of adhesive can be used. If two (or more) pieces are used, the pieces may be bonded so as not to be in contact with each other. Alternatively, if two (or more) pieces are used, the pieces may be in contact with each other or may be directly adjacent to one another.

Assembly of the pieces of mounting assembly 200 of FIG. 2 is shown schematically in FIGS. 3A-3F. The interconnection between the pieces of the mounting assembly 200 of FIG. 2 is shown schematically in FIGS. 3A-3F.

Figure 3A:
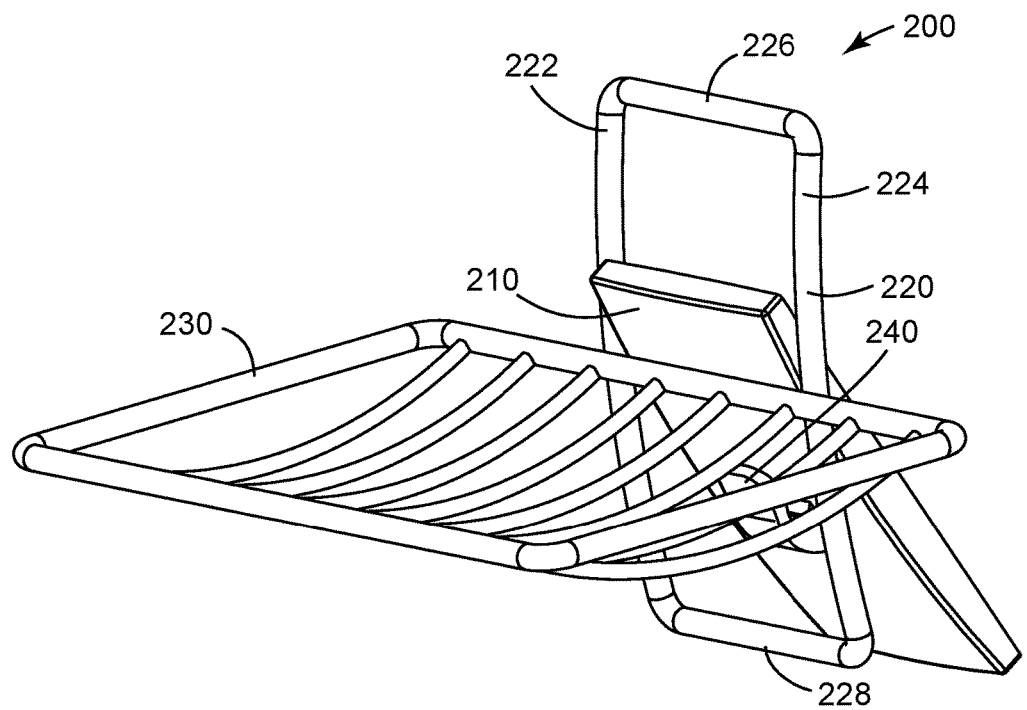
FIGS. 3A-3F are step-wise schematic views of the mounting assembly of FIG. 2 in operation.

As shown in FIG. 3A, the user moves cover plate 210 to engage with accessory 230 such that a portion of accessory 230 fits or snaps into or onto hook 240.

Figure 3B:
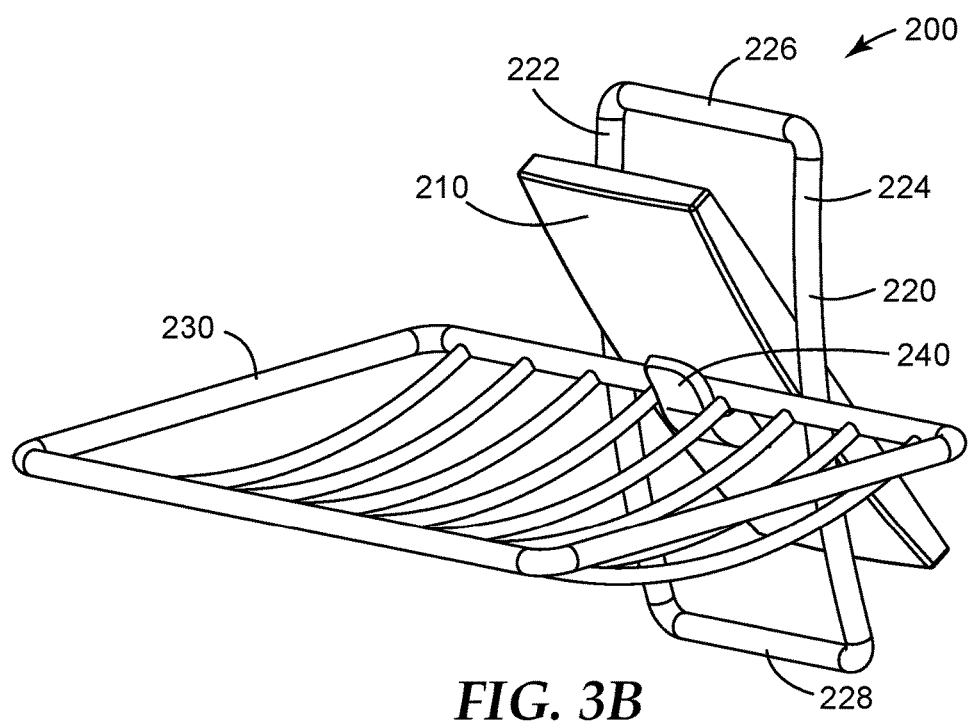

As shown in FIG. 3B, the user pushes accessory 230 and cover plate 210 together until they snap, click, or otherwise fully engage. In some embodiments, when fully engaged, hook 240 holds accessory 230 securely in place and minimizes its vertical, horizontal, and rotational movement.

Figure 3C:
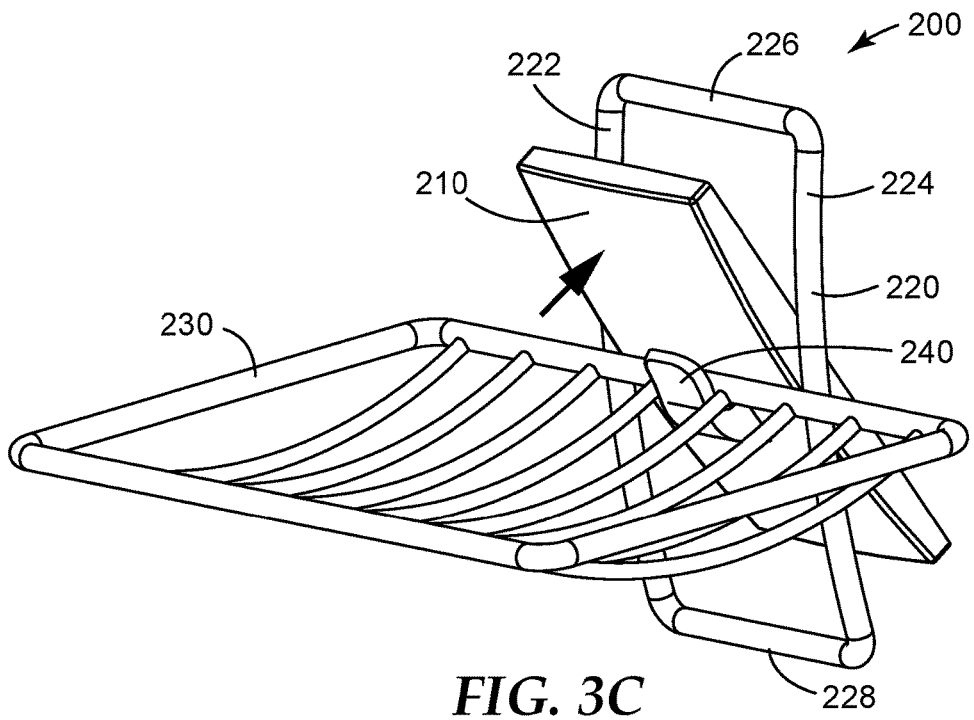
Figure 3D:
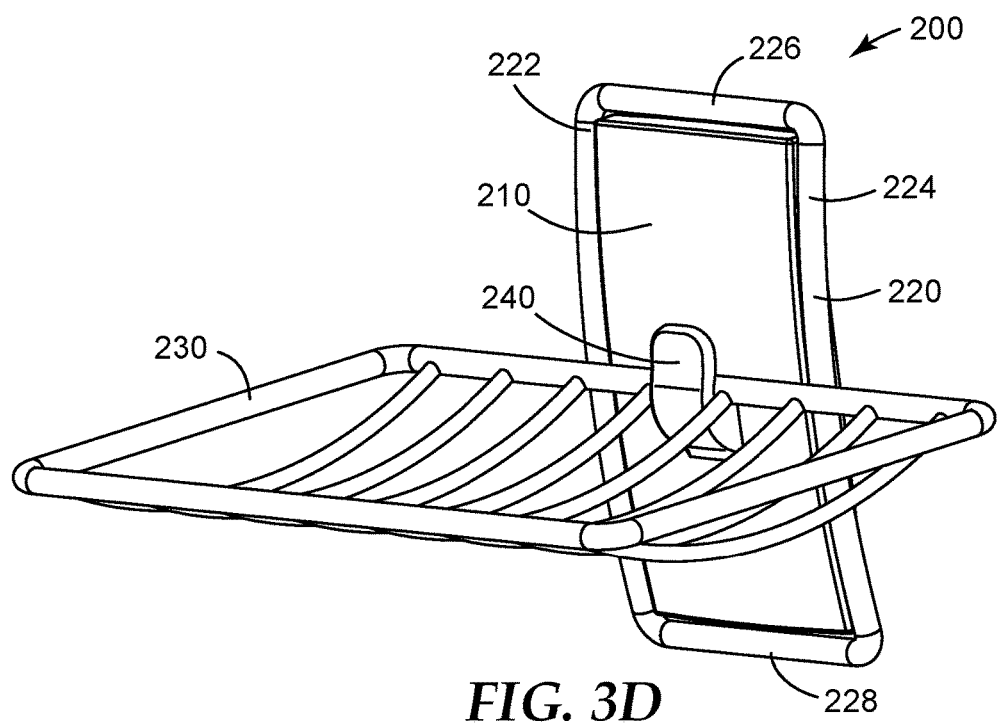

As shown in FIG. 3C, the user then rotates cover plate 210 until it is generally flush with frame 220 (as shown in FIG. 3D). Cover plate is preferably flush with top and bottom portions or members 226, 228 of frame 220.

Figure 3E:
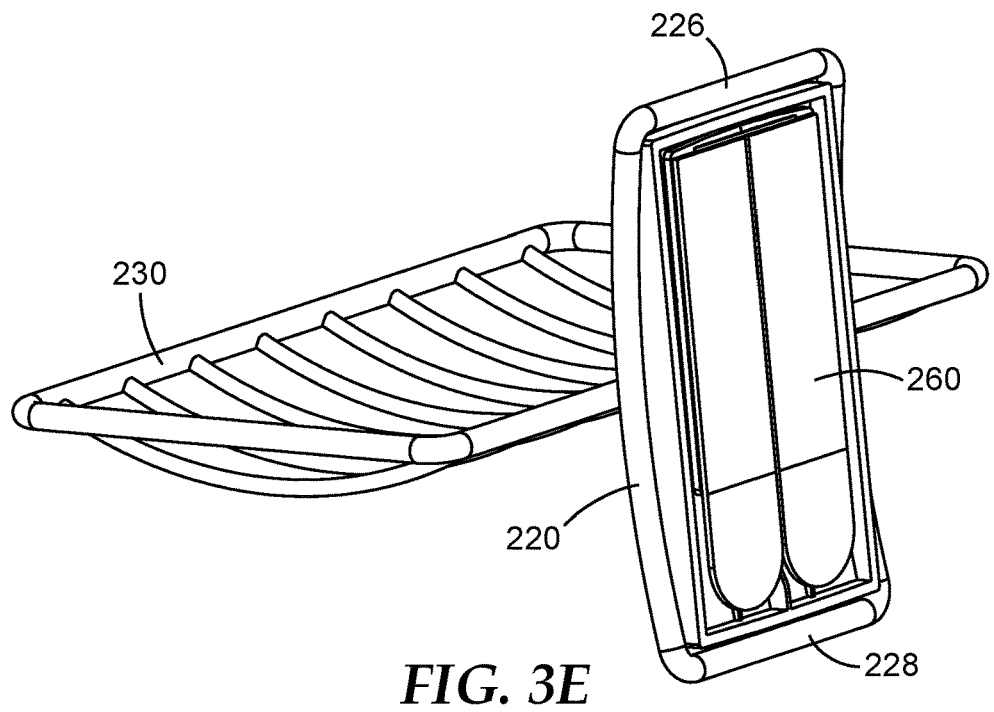

The user then slides or otherwise attaches cover plate 210 into or onto backplate 250. FIG. 3E shows a backside view of the construction of FIG. 3D and specifically shows cover plate 210 adhered or attached to backplate 250. FIG. 3E also shows the one or more double-sided adhesive strips 260 adhered or attaches to backplate 250. Adhesive strips 260 mount, adhere, or attach cover plate 210 (and ultimately mounting assembly 200) to a wall or vertical surface. Adhesive strips 260 can be any desired adhesive strip product or formulation, as is described in greater detail herein.

Figure 3F:
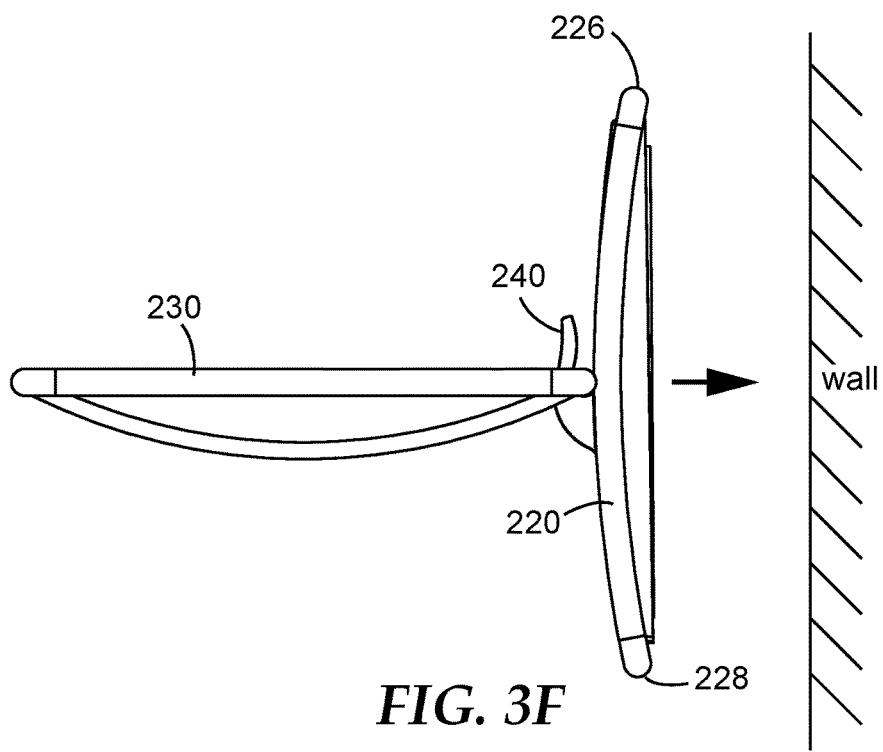

Lastly, as shown in FIG. 3F, the user removes the liner from adhesive strips 260 and engages (e.g., pushes) the entire mounting assembly with (onto or adjacent to) the vertical surface or wall. Adhesive strips 260 adhere to the wall with sufficient strength to permit the entire mounting assembly to be mounted on or to the wall or vertical surface.

When the cover plate 210 and back plate 250 assembly are attached to a wall with adhesive strips 260, cover plate 210 can no longer rotate at the hook 240 relative to the frame and thus effectively locks frame 220 and cover plate 210 together.

In this manner, the pieces of the mounting assembly can be attached, removed, and/or reattached to each other and to a wall.

A summary of the steps involved in removing the mounting assembly from the wall is as follows. First, the user holds onto either the accessory or the bottom or side members of the frame and slides the cover plate off of the backplate.

Next, the user removes the backplate from the wall by following the directions of the specific type of adhesive strips that were used to adhere or attach the backplate to the wall. Viola—the removal process is complete!

One of the benefits of the mounting assemblies of the present disclosure is that they can be removed more quickly, easily, and more intuitively than alternative mounting assemblies. In some embodiments, the mounting assemblies of the present disclosure can be removed in fewer steps. Specifically, the accessory and cover plate can simultaneously (as a single unit) be removed (slid from) the backplate. This eliminates the step of removing the accessory from the cover plate.

Further, many users tend to grab onto the accessory and pull upwards when quickly removing the mounting assembly. In other constructions, this natural, intuitive action will result in disengagement of the accessory from the cover plate. At best, this results in a two-step process to remove the accessory and cover plate from the backplate attached to the wall. At worst, this can break the attachment mechanism or the portion of the accessory attached to the attachment mechanism, thereby destroying the re-usability of the apparatus. The mounting assemblies of the present disclosure, in contrast, will always slide off the backplate when the user pushes upwardly on the installed accessory. The mounting assemblies of the present disclosure will never disengage at the attachment point between the cover plate and accessory. Instead, they will always disengage at the attachment point between the cover plate and the backplate.

Figure 4:
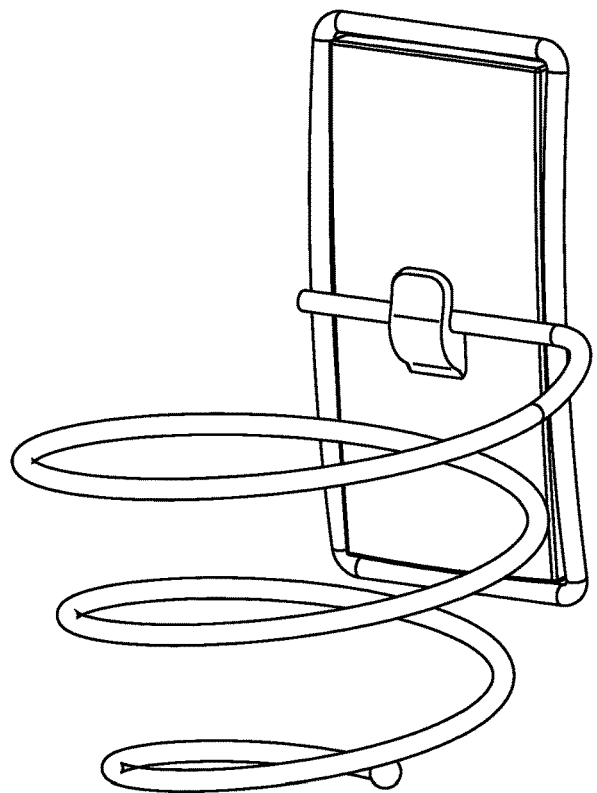
FIG. 4 is a schematic view of another mounting assembly according to the present disclosure.
Figure 5:
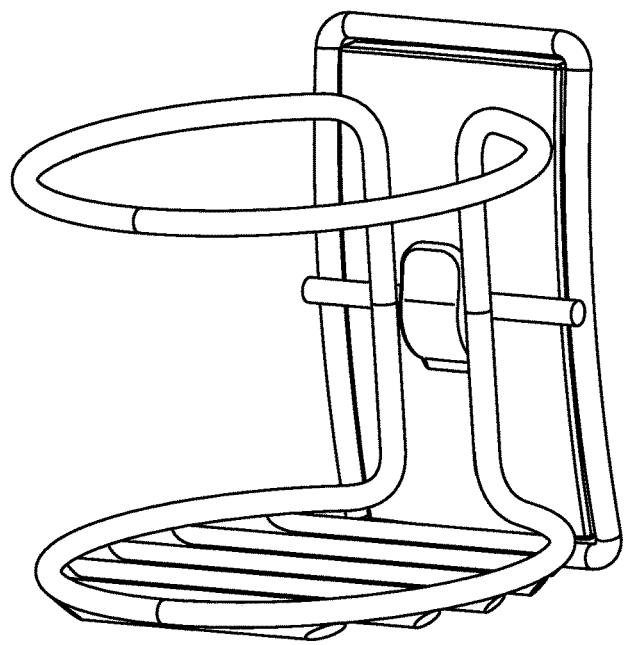
FIG. 5 is a schematic view of another mounting assembly according to the present disclosure.
Figure 6:
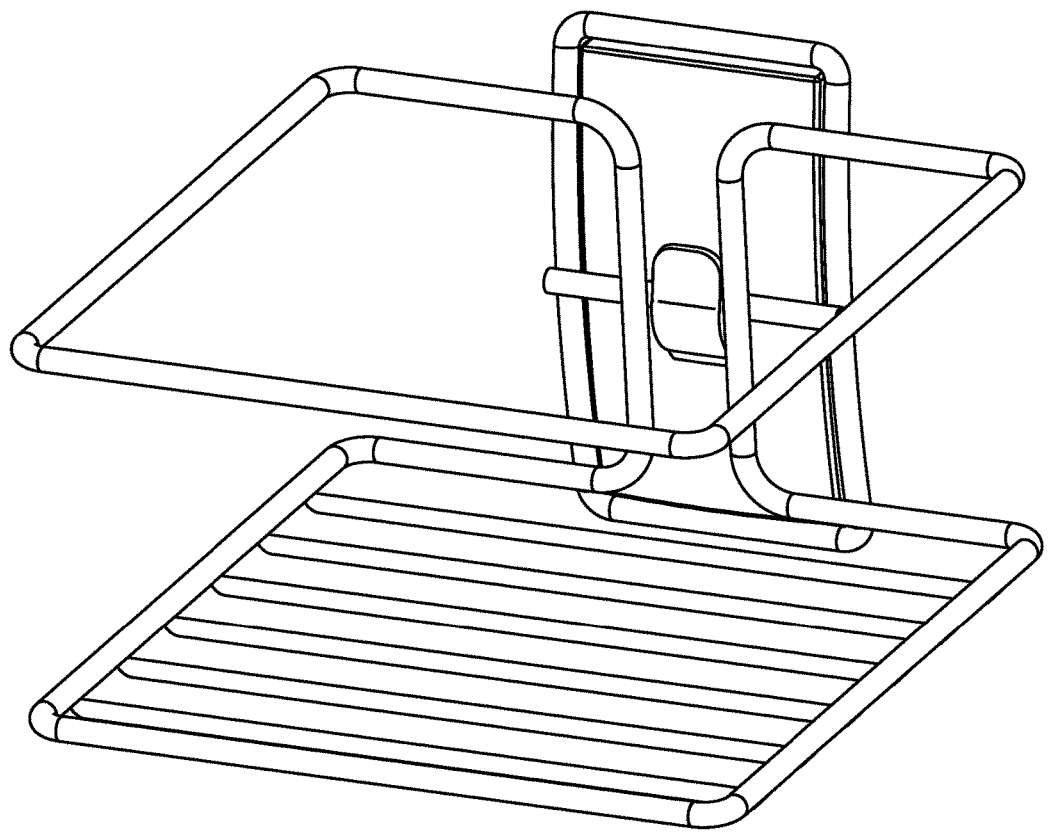
FIG. 6 is a schematic view of another mounting assembly according to the present disclosure.

As stated above, the accessory used in the mounting assemblies of the type generally described herein can vary. FIGS. 4-6 show varying exemplary alternative accessories that can be used with or in a mounting assembly of the type described herein.

In general, the cover plates and accessories of the mounting assemblies of the present disclosure are attachable to each other in a removable manner. In the present disclosure, the term "removably attachable" means that the accessory and the cover plate can be attached to each other, can be separated from each other, and can be reattached to each other (e.g., multiple times).

In some embodiments, the cover plate and accessory are attachable to each other in a deflectable manner. In the present disclosure, the term "deflectably attachable" means that cover plate and accessory, when attached (e.g., connected) to each other, can be deflected (e.g., moved) relative to each other at least a small amount, without becoming detached from each other. In some embodiments, with the entire mounting assembly attached to a wall, it is possible to move at least a portion of the accessory at least a small amount, relative to the wall, while maintaining the attachment between the cover plate and the accessory.

Like reference symbols in the various figures indicate like elements. Unless otherwise indicated, all figures and drawings in this document are not to scale and are chosen for the purpose of illustrating different embodiments of the inventions. In particular, the dimensions of the various components are depicted in illustrative terms only, and no relationship between the dimensions of the various components should be inferred from the drawings, unless so indicated.

Although terms such as "top", bottom", "upper", "lower", "under", "over", "front", "back", "outward", "inward", "up" and "down", and "first" and "second" may be used in this disclosure, it should be understood that those terms are used in their relative sense only unless otherwise noted.

The term "wall" as used herein is not limited to items that are substantially vertical and/or that comprise, e.g., walls of buildings. Thus, the term "wall" as used herein encompasses such items as ceilings, shelves, and the like.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present disclosure should, therefore, be determined only by the following claims.

What is claimed is:

1. A mounting assembly, comprising:
   a backplate;
   a cover plate having a front surface, a rear surface, a top edge, a bottom edge, and opposing side edges, the front surface of the cover plate including an attachment device capable of attaching an accessory to the cover plate;
   the rear surface of the cover plate capable of being slid into or otherwise attached to the backplate;
   a frame having a bottom member a top member, and at least one side member that cooperate to define a frame cavity for receiving the cover plate and, when the cover plate is received in the frame cavity, the top and bottom members are closely adjacent to the top and bottom edges of the cover plate, respectively, such that the bottom and top members are flush with the cover plate and cooperatively limit or prohibit lateral motion of the cover plate relative to the frame when the cover plate is in the frame and attached to the backplate; and
   adhesive strips capable of adhering the backplate to a wall, wherein the cover plate and the frame are adapted to be slidably removable from the backplate in the direction of the top member when the assembly is adhered to the wall, the cover plate is received in the frame cavity and the accessory is attached to the cover plate.

2. The mounting assembly of claim 1, wherein the accessory is at least one of a utensil, a decoration, a shelf, a container, and a tool.

3. The mounting assembly of claim 1, wherein the at least one side member comprises opposed side members that cooperate with the top and bottom member to define the frame cavity.

4. The mounting assembly of claim 1, wherein the frame includes opposed first and second side members that, when the frame is received in the frame cavity, are each disposed adjacent an opposing side edge of the cover plate.

5. The mounting assembly of claim 4, wherein the opposed top and bottom members each connect with and are generally perpendicular to each of the opposed side members.

6. The mounting assembly of claim 1, wherein the attachment device is a hook.

7. The mounting assembly of claim 1, wherein the accessory snaps into the attachment device.

8. The mounting assembly of claim 1, wherein the adhesive strips are double-sided adhesive strips.

9. The mounting assembly of claim 1, wherein the adhesive strips are stretch-release adhesive strips.

10. The mounting assembly of claim 9, wherein the adhesive strips include a tab.

11. The mounting assembly of claim 1, wherein the accessory is a soap holder.

12. A method of removing a mounting assembly from a wall, the method comprising:

providing the mounting assembly of claim 1 adhered to the wall and having an accessory attached to the cover plate;

moving the cover plate and accessory in an upward direction towards the top member of the frame to detach the cover plate from the backplate;

and removing the backplate from the wall.

13. The method of claim 12, wherein the step of moving the cover plate and accessory in an upward direction further comprises moving the frame along with the cover plate and the accessory.

14. The mounting assembly of claim 1, wherein the cavity has a rectangular shape.

15. The mounting assembly of claim 1, wherein the rear surface of the cover plate is adapted to be slid into the backplate.

16. The mounting assembly of claim 1, wherein the cover plated rotatable into the cavity.

\* \* \* \* \*